Dec. 12, 1933.  N. KRAMER  1,939,175
AUTOMOBILE RADIATOR
Filed Dec. 17, 1929  2 Sheets-Sheet 1
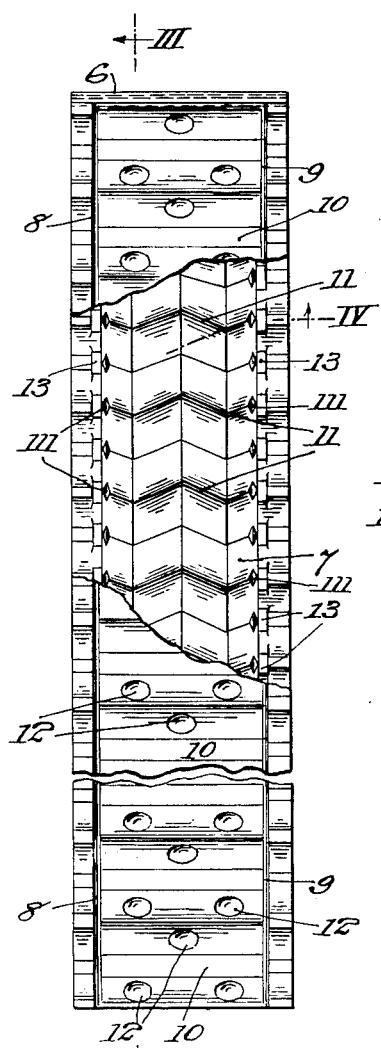
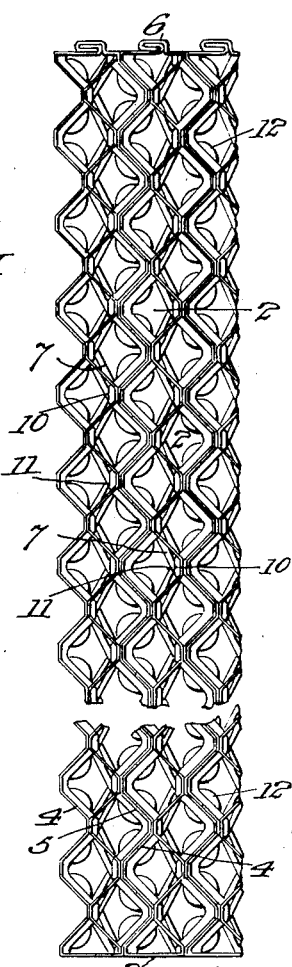
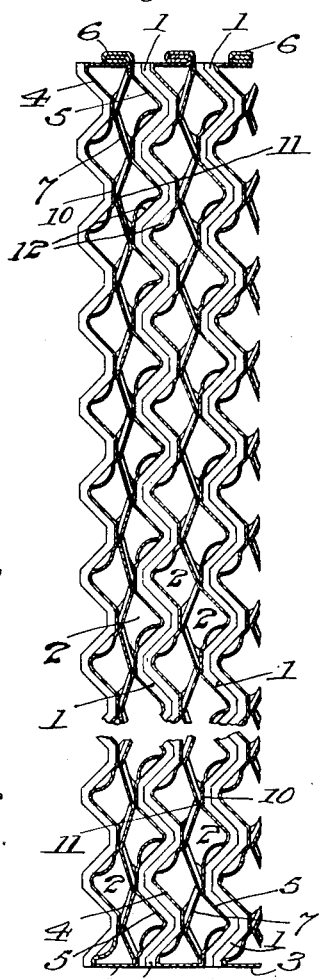
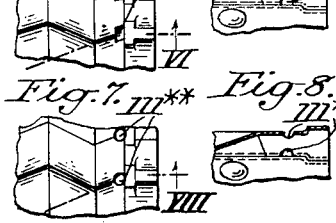
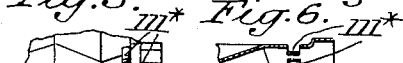
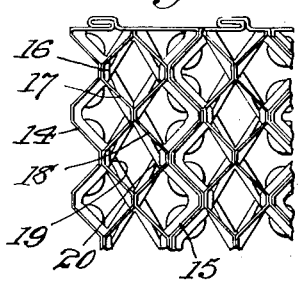
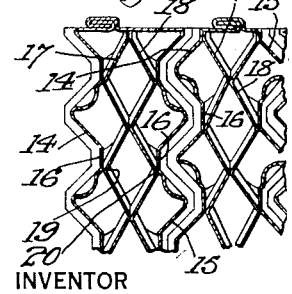
INVENTOR
Nathan Kramer
BY
ATTORNEYS Dec. 12, 1933.  N. KRAMER  1,939,175
AUTOMOBILE RADIATOR
Filed Dec. 17, 1929   2 Sheets-Sheet 2

INVENTOR
Nathan Kramer
BY
ATTORNEYS

Patented Dec. 12, 1933

1,939,175

UNITED STATES PATENT OFFICE 1,939,175

AUTOMOBILE RADIATOR

Nathan Kramer, Trenton, N. J., assignor to Trenton Auto Radiator Works, Inc., Trenton, N. J., a corporation of New Jersey Application December 17, 1929
Serial No. 414,719

2 Claims. (Cl. 257—130)

This invention relates to improvements in automobile radiators and has for its object to provide a plurality of coacting units, each of which units is formed of outer and intermediate walls of corrugated sheet metal and assembled in position so that the crests of adjacent corrugations will be engaged throughout their length to insure a maximum thermal contact and dissipate the heat generated between the walls of the water passages.

Another object is to provide the outer and intermediate walls of a unit of corrugated sheet metal, in which certain of the crests of the corrugations are blunt, while the adjacent coacting crests are sharp, thereby effecting a totality of contact of the crests throughout the depth of the core.

Another object is to provide a unit having corrugated outer and intermediate sheet metal walls, the crests of certain of the corrugations being of zig-zag formation, while the coacting crests of the adjacent walls are straight throughout the depth of the unit, thereby producing an efficient radiating surface and turbulence means.

Another object is to provide a unit having corrugated outer and intermediate sheet metal walls, the crests of the walls being arranged to coact throughout their entire length from front to rear, and having portions of the crests spaced from the front and rear edges of the unit being displaced for breaking the capillary attraction and arresting the flow of the molten solder along the intermediate contact surfaces of the crests when being secured into a section.

Another object is to provide certain improvements in the form, construction and arrangement of the several parts whereby the above named and other objects may effectively be attained.

A practical embodiment of my invention is represented in the accompanying drawings, in which Fig. 1 represents a detail front elevation of a portion of an automobile radiator section.

Fig. 2 represents a side elevation of the same, a portion of the outer wall being broken away to show the intermediate wall more clearly.

Fig. 3 represents a longitudinal vertical section taken in the plane of the line III—III of Fig. 2 looking in the direction of the arrows.

Fig. 4 represents a detail horizontal section taken in the plane of the line IV of Fig. 1 looking in the direction of the arrow.

Fig. 5 represents a detail side elevation of a portion of a modified form of intermediate wall of a unit.

Fig. 6 represents a horizontal section taken in the plane of the line VI of Fig. 5 looking in the direction of the arrow.

Fig. 7 represents a detail side elevation, similar to Fig. 5, showing an intermediate wall of a unit having the portion of the crests cut away.

Fig. 8 represents a horizontal section taken in the plane of the line VIII of Fig. 7 looking in the direction of the arrow.

Fig. 9 represents a front elevation of a portion of a modified form of a radiator section.

Fig. 10 represents a longitudinal vertical section similar to that shown in Fig. 3.

Figure 12:
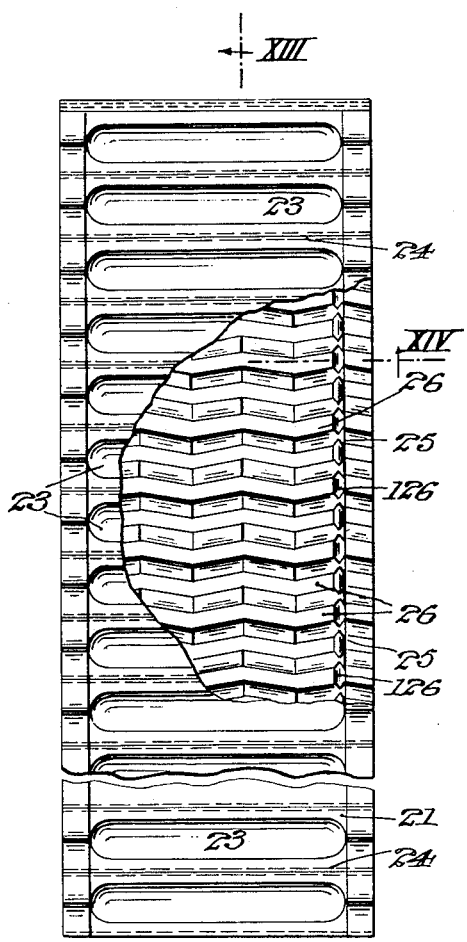
Fig. 12 represents a side elevation of the same, a portion of the outer wall being broken away to show the intermediate wall more clearly.
Figure 11:
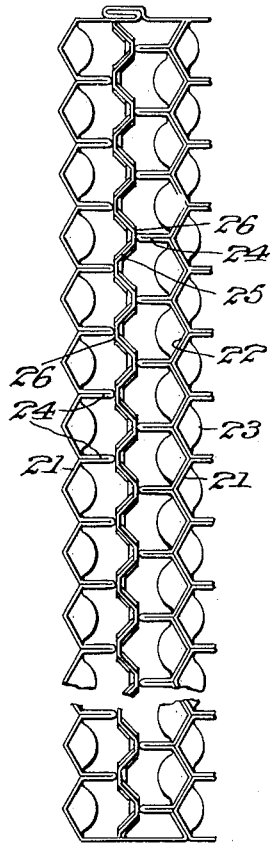
Fig. 11 represents a front elevation of the portion of still another form of radiator section.
Figure 13:
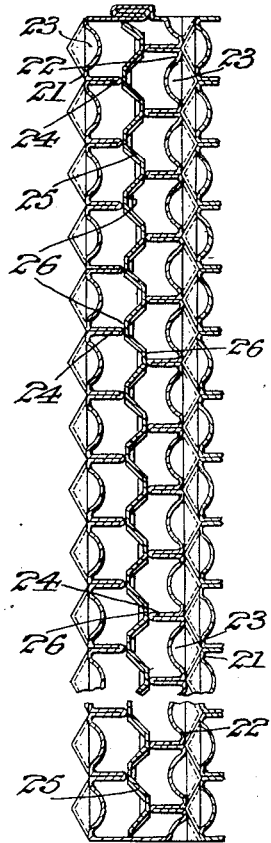
Fig. 13 represents a longitudinal vertical section taken in the plane of the line XIII—XIII of Fig. 12 looking in the direction of the arrows.
Figure 14:
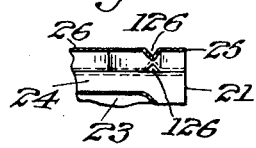
Fig. 14 represents a detail horizontal section taken in the plane of the line XIV of Fig. 12 looking in the direction of the arrow.

In the structure shown in Figs. 1 to 4 inclusive, I have illustrated several units assembled to form a portion of a radiator section having a series of vertically disposed sinuous water passages denoted by 1, and a plurality of horizontally arranged air passages denoted by 2, disposed in staggered relation upon opposite sides of the vertical water passages. The water passages 1 are arranged in position to communicate with upper and lower chambers (not shown) of a radiator section in a manner well known in the art. Each unit of the section is composed of a strip of corrugated sheet metal bent at 3 to form oppositely disposed walls 4, 5, the ends of which are turned toward each other and secured at 6, in any well known or approved manner, and a strip of corrugated sheet metal 7 is interposed between the walls 4, 5, so that the crests of its corrugation will contact with the crests of the adjacent corrugation of the walls.

The vertical water passages are formed by depressing the outer walls 4, 5 inwardly between points 8, 9 spaced from the front and rear edges of the walls, as shown in Fig. 2. Each of the depressions in the outer walls 4, 5 form one half of each vertical water passage and, when the units are assembled, the adjacent walls are brought into coaction so as to complete the passage.

The crest of each inwardly projecting corrugation of the walls 4, 5 is provided with a flattened portion 10 which extends in a straight line throughout the length of the depressed portion, while each crest 11 of the intermediate strip 7, which coacts with the flattened portion 10 of the corrugations of the walls, is substantially sharp. The crest 11 of each intermediate strip 7 is also developed into zig-zag formation substantially from front to rear, and by its contact with the adjacent straight crest effects an efficient radiating surface, as well as produces a desired turbulence means.

In order to increase the capacity of the vertical water passages 1, the depressed portion of the walls 4, 5 are provided with a series of pockets 12 formed in the walls of the corrugations and disposed in staggered relation.

The corrugations on the longitudinal edges of the strip 7 are straight so as to coact with the straight corrugations on the longitudinal edges of the walls 4, 5.

To position the intermediate strip 7 between the outer walls 4, 5, I provide depressed recesses 13 interposed between the straight corrugations on the longitudinal edges and the zig-zag crest 11, which recesses are oppositely disposed so as to receive the outer ends of each of the corrugations of the depressed portion forming the vertical water passage of the outer walls.

In the form shown in Figs. 9 and 10, the outer walls 14, 15 of each unit are formed similar to that set forth in Figs. 1 to 4 inclusive, and each inwardly projected crest of the corrugations is flattened at 16. Between these walls 14, 15, I interpose strips 17, 18 of corrugated sheet metal, the corrugations of which are disposed in opposite directions. The intermediate strip 17 is provided with zig-zag crests 19 which coact with the flattened portions 16 of the wall 14, while the strip 18 has zig-zag crests 20 which contact with the flattened portions 16 of the corrugations on the outer walls 15. The width of the flattened crests in each of the forms above described is determined by the amplitude of the zig-zag crests coacting therewith, so that a thermal contact is maintained throughout the entire length of the crests.

In the modified form shown in Figs. 11 to 14 inclusive, the outer corrugated walls 21, 22 are provided with a series of straight depressions 23 and inwardly projecting straight fins 24 interposed between the depressions 23.

A corrugated strip 25 is disposed between the walls 21, 22, the crests 26 of which corrugations are flattened and are of zig-zag formation, as shown in Fig. 12, so that each straight fin 25 will contact with one of the zig-zag flattened crests 26 and produce an effective thermal contact therewith.

In order to assemble a radiator section, a plurality of units are brought into co-operative engagement and clamped together by any convenient means, after which the front and rear contact edges of the units are dipped in hot molten solder which, when cooled, hardens and firmly secures the units into a section. After the front and rear edges are soldered, the tops and bottoms of the units are similarly dipped in hot molten solder, and when cooled and hardened, the radiator section is ready for testing as to leaks, etc.

When the front and rear edges of the assembled units are being dipped in molten solder, it frequently occurs that the liquid solder will flow, by capillary attraction, upwardly throughout the length from front to rear of the adjacent coacting crests and, in order to prevent this disadvantageous feature, I displace a portion of each of the crests of the intermediate walls, as shown at 111 in Figs. 2 and 4, which portions are spaced from the front and rear edges of the walls and disposed adjacent the recesses 13, thereby interrupting the continuity of the crests.

In Figs. 5 and 6 a portion of each of the crests of the intermediate walls is slit and the slit portion 111* bent away from its crest to form a gap in the continuity of the crest.

In Figs. 7 and 8 each crest of the intermediate walls has a perforation 111** to interrupt the continuity of the crest.

In the forms shown in Figs. 11 to 14 inclusive, similar means for arresting the capillary attraction of the fluid solder is provided in the intermediate walls by displacing a portion of each flattened crest as shown at 126, which portions are spaced from the front and rear edges of the units.

From the foregoing, it will be seen that a radiator section of this construction is rigid, compact, and economical to manufacture. Furthermore, the structure provides an efficient thermal contact between the intermediate wall and the water passages throughout the full depth of the section from front to rear, thereby obtaining maximum effectiveness as a radiating surface and turbulence means.

It is obvious that various changes may be resorted to in the form, construction, and arrangement of the several parts without departing from the spirit and scope of my invention; and hence, I do not intend to be limited to the details herein shown and described except as they may be included in the claims.

What I claim is:

1. An automobile radiator section having a plurality of coacting units arranged to form a series of vertically disposed sinuous water passages therein, each unit comprising corrugated sheet metal walls developed each to form one wall of adjacent water passages, and at least one corrugated sheet metal wall interposed between said water passage walls, the crests of certain of the walls being straight and the crests of the adjacent walls being of zigzag formation, each of said straight crests being flattened and having a width equal to the amplitude of the zigzag crest, whereby each zigzag crest will be disposed in continuous contact with the adjacent straight flattened crest throughout the length of the crests, and portions of the intermediate wall being cut at the ends of the crests to interrupt the flow of solder along the contact surfaces of the crests when being secured into a section.

2. An automobile radiator section having a plurality of coacting units arranged to form a series of vertically disposed water passages therein, each unit comprising corrugated sheet metal walls developed each to form one wall of adjacent water passages, and at least one corrugated sheet metal wall interposed between said water passage walls and provided with crests of zigzag formation, each of the crests of the water passage walls being straight and flattened and having a width equal to the amplitude of the zig-zag crest, whereby each zigzag crest will be disposed in continuous contact with the adjacent straight flattened crest throughout the length of the crests, and portions of the intermediate wall being cut at the ends of the crests, to interrupt the flow of solder along the contact surfaces of the crests when being secured into a section.

NATHAN KRAMER.